April 28, 1959
W. M. DE HARDIT
2,883,775
LAND CLEARING MACHINE
Filed May 27, 1955
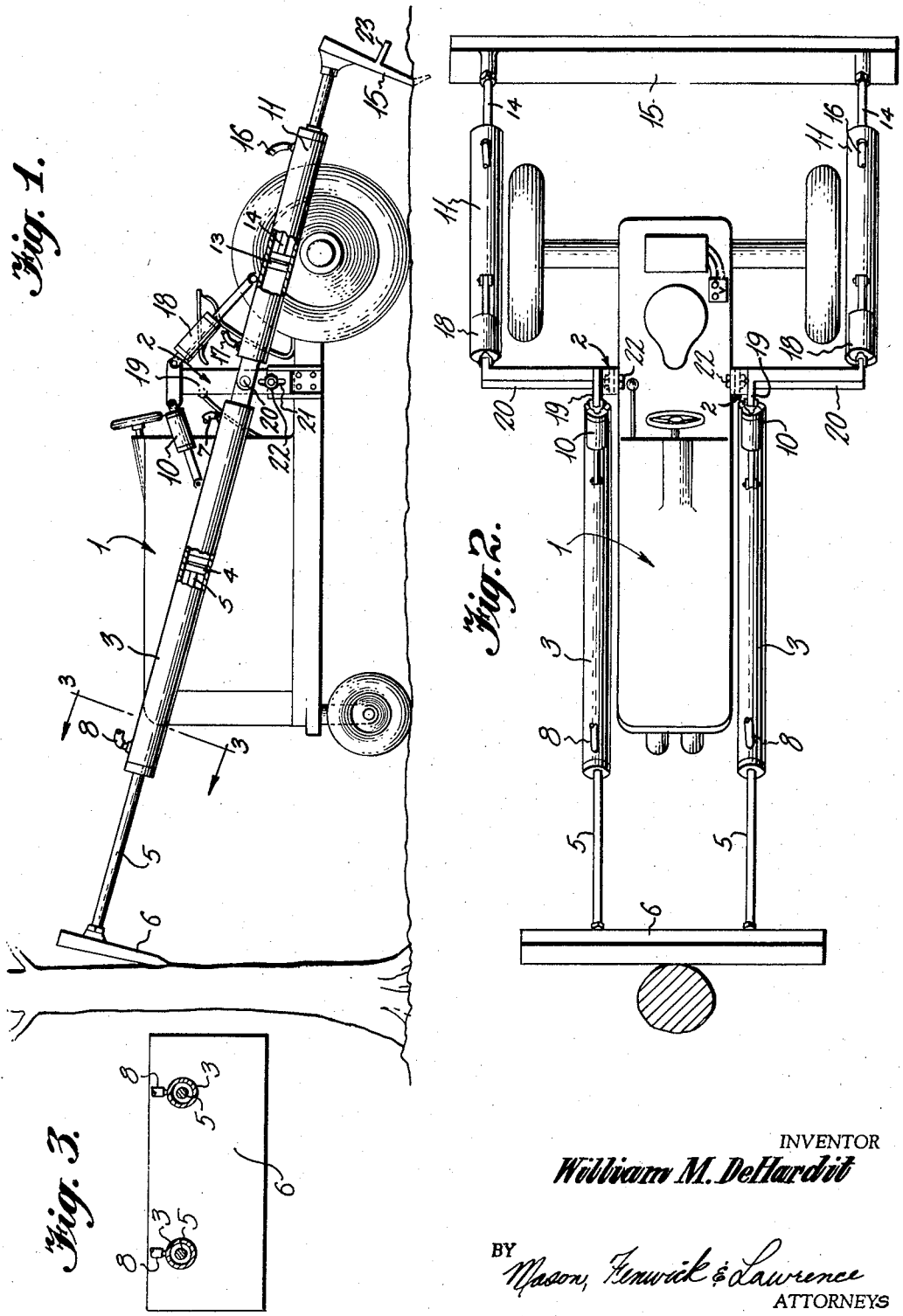
INVENTOR
William M. DeHardit
BY
Mason, Fenwick & Lawrence
ATTORNEYS

United States Patent Office 2,883,775
Patented Apr. 28, 1959

2,883,775

LAND CLEARING MACHINE

William M. De Hardit, Gloucester, Va.

Application May 27, 1955, Serial No. 511,630

2 Claims. (Cl. 37—144)

This invention relates to land-clearing devices, and more particularly to machines specially adapted to pushing over trees or other objects which it may be desirable to remove.

Hydraulic rams mounted upon mobile carriages for pushing over trees are known. These consist of a boom, which is extensible, to be placed against a tree trunk and the boom extended to exert pressure against the tree. Such machines have little advantage over the conventional bulldozer, as the maximum pressure which can be used is determined by the traction which the machine has with the ground. With the bulldozer, the endless tread will slip before the total possible power of the machinery can be exerted. The same is true of the hydraulic rams now known, the transporting vehicle will lose its grip upon the earth and be slid backward upon the application of great pressure.

The object of the present invention is to provide a mobile hydraulic ram with means for anchoring the transporting vehicle to resist displacement of the vehicle when the ram is in use.

Another object of the invention is to provide such a machine in which the anchoring means is arranged to exert an opposite force to the ram.

A still further object is the provision of a device of this kind where the opposed forces of the anchor and ram are taken through one another, so that there is no strain imposed on the transporting vehicle.

Other objects of the invention will appear as the following description of one practical embodiment of the invention proceeds, reference being had to the drawings which accompany, and form part of, this specification.

In the drawings:

Figure 1 is a side view of a machine for felling trees which embodies the principles of the present invention;

Figure 2 is a top plan view of the machine; and,

Figure 3 is a vertical section taken on the line 3—3 of Figure 1.

In general, the invention consists of a land clearing machine having forwardly and rearwardly extending arms which can be used to exert pressure against a tree or other obstacle to be pushed over. While one arm is being used as a ram, the other may be used as an anchor. Both will be vertically movable and longitudinally extendible, and the two arms are interconnected so that all strain is through the arms and none is imposed upon the transporting vehicle.

Referring to the drawings in detail, there is shown a tractor 1 which may be a wheeled tractor or the large endless tread type depending upon the work to be done. A support 2 is rigidly secured on opposite sides of the tractor near the center. The supports form means for attaching the pushing and anchoring arms to the tractor.

The forwardly extending arm comprises a pair of cylinders 3, connected at their back end to the supports 2. Each cylinder slidably receives a piston 4, having a piston rod 5 projecting through the forward end of the cylinder. The outer ends of the piston rods are joined to a conventional bulldozer scraper blade 6. Fluid lines 7 and 8 are connected to opposite ends of the cylinders so that through a conventional hydraulic control system (not shown) the pistons may be advanced or retracted as desired to position the blade 6. A piston assembly 10 connected to the arm and the support 2 controls vertical movement of the arm.

A second arm, similar to the first, is arranged to extend rearwardly from the tractor. This arm is composed of a pair of cylinders 11 pivotally connected to the supports 2. Cylinders 11 carry pistons 13 having piston rods 14, and the rods are connected at their ends to a scraper blade 15. Fluid lines 16 and 17 are connected to the cylinders 11. This arm is also vertically movable by means of piston assemblies 18, connected to the cylinders 11 and the supports 2.

It will be apparent that the arms may be of double cylinder construction, as shown, or a single cylinder may be used with the blade at the end.

In the embodiment shown, the arms are arranged so that all stresses are taken by the arms and mounting structure and none is imposed upon the transporting vehicle. To this end, the cylinders 3 and 11 are mounted on common pivots 20 carried by the supports. Thus, the stresses are carried through from one arm to the other by means of the pivot pins and no strain is imposed upon the tractor. If desired, the support 19 may be made in two sections bolted together. One of the sections may be slotted, as at 21, to receive the bolt 22. This arrangement will permit vertical adjustment of the pushing and anchoring arm assemblies so that when moving low objects the arms can be parallel to the ground. The rear arms have been shown bent outwardly so that there will be no interference from the wheels.

The operation of the machine will be apparent. Either one of the arms may be used to push against a tree and the other may be dropped to bite into the ground and serve to anchor the vehicle. After the arms are positioned, the pushing arm is extended to push over the tree. By proper manipulation of the arms, and adjustment of the supports, the opposing forces exerted by the arms may be in a direct line.

While in the above practical embodiments of the invention have been disclosed it will be understood that the details of structure shown and described are merely by way of illustration and the invention may take other forms within the scope of the appended claims.

What is claimed is:

1. In a land clearing machine, a mobile vehicle, supports mounted at the sides of the vehicle, means for adjusting the supports vertically, arms pivoted to and projecting forwardly from the supports, a scraper blade connecting the arms beyond the front of the vehicle, arms pivoted to and projecting rearwardly from the supports, a scraper blade connecting the rearwardly projecting arms beyond the rear of the vehicle, the arms connected to one of the scraper blades being longitudinally extensible, and means to extend the extensible arms, the pivotal connections of all of the arms being arranged on a common axis whereby thrust upon one of the scraper blades may be transmitted through the arms to the other scraper blade and the pivotal connections to the arms may be raised and lowered to permit alignment of the arms for straight thrust at various heights relative to the vehicle.

2. In a land clearing machine as claimed in claim 1, means to rock the forwardly and rearwardly projecting arms independently about their pivotal connections to the supports, the arm rocking means being connected to the supports whereby the arms and their rocking means will maintain fixed relative positions when the supports are raised and lowered.

References Cited in the file of this patent

UNITED STATES PATENTS

| | | |
|---|---|---|
| 2,404,518 | Moran | July 23, 1946 |
| 2,630,638 | LeTourneau | Mar. 10, 1953 |
| 2,663,952 | Winget | Dec. 29, 1953 |
| 2,784,508 | Risk | Mar. 12, 1957 |

FOREIGN PATENTS

| | | |
|---|---|---|
| 149,106 | Australia | Nov. 19, 1952 |
| 922,158 | Germany | Jan. 10, 1955 |